(12) United States Patent
Wu et al.

(10) Patent No.: US 10,838,099 B1
(45) Date of Patent: Nov. 17, 2020

(54) MULTI-MODE DATA OBSERVATION METHOD BASED ON UNMANNED AERIAL VEHICLE FORMATION FOR SEMI-AIRBORNE ELECTROMAGNETIC SURVEYING

(71) Applicants: Xin Wu, Beijing (CN); Guoqiang Xue, Beijing (CN); Qingyun Di, Beijing (CN)

(72) Inventors: Xin Wu, Beijing (CN); Guoqiang Xue, Beijing (CN); Qingyun Di, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 9 days.

(21) Appl. No.: 16/411,326

(22) Filed: May 14, 2019

(51) Int. Cl.
*G01V 3/10* (2006.01)
*G01V 3/165* (2006.01)

(52) U.S. Cl.
CPC .................................. *G01V 3/165* (2013.01)

(58) Field of Classification Search
CPC ............. G01V 3/15; G01V 3/16; G01V 3/165
See application file for complete search history.

(56) References Cited

U.S. PATENT DOCUMENTS 7,948,237 B2 * 5/2011 Kuzmin ................... G01V 3/16
324/331
2017/0123093 A1 * 5/2017 West ........................ G01V 3/17

* cited by examiner

*Primary Examiner* — Tung X Nguyen

(57) ABSTRACT

Disclosed in the present invention is a multi-mode data observation method based on unmanned aerial vehicle formation for semi-airborne electromagnetic surveying. The method includes four basic formation modes: a ZX formation mode for obtaining the Z component of the response field with a high signal-to-noise ratio and the X direction gradient data of the Z component of the response field in different scales; a ZZ formation mode for obtaining the Z direction gradient data of the Z component of the response field in different scales; an XX formation mode for obtaining the X component of the response field with a high signal-to-noise ratio and the X direction gradient data of the X component of the response field in different scales; an XZ formation mode for obtaining the Z direction gradient data of the X component of the response field in different scales.

6 Claims, 6 Drawing Sheets

MULTI-MODE DATA OBSERVATION METHOD BASED ON UNMANNED AERIAL VEHICLE FORMATION FOR SEMI-AIRBORNE ELECTROMAGNETIC SURVEYING

TECHNICAL FIELD

The present invention relates to an airborne transient electromagnetic prospecting technology and belongs to the field of geophysical prospecting.

BACKGROUND ART

An electromagnetic method is a geophysical prospecting method based on the principle of electromagnetic induction, which observes, based on the difference in physical properties of the underground medium such as the conductivity, a response electromagnetic field (i.e., a secondary field) generated by the earth under excitation of natural or artificial field sources, and finally extracts underground structural information by analyzing spatial and temporal distribution of the secondary field, thus being widely applied in the fields of investigation of resources such as mineral products, groundwater and geothermal resources, as well as the fields of geological mapping and environmental engineering.

Traditional electromagnetic surveying methods are all ground methods, i.e., the entire observation system is arranged on the ground. In order to solve the problems that the rapid large-area coverage is difficult to achieve for the traditional ground methods in areas such as Gobi, desert, gully or areas with dense water networks, and areas covered by forests, an airborne electromagnetic method is proposed by researchers.

Based on "whether the devices are all carried on the flight platform", the airborne electromagnetic method can be divided into an airborne method and a semi-airborne method.

Figure 1:
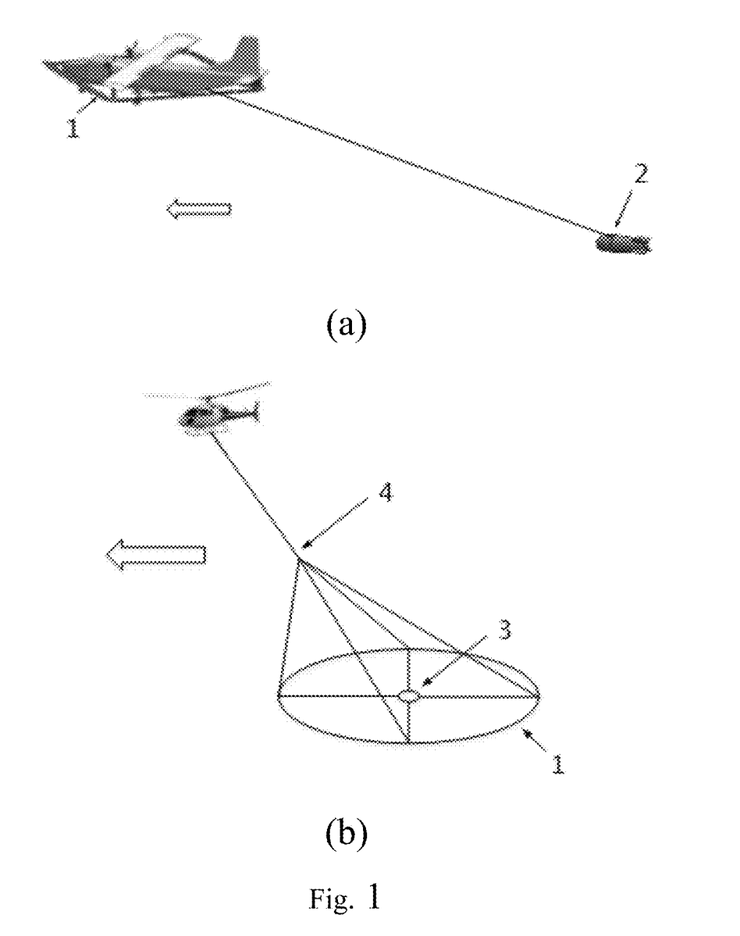
FIG. 1 is a schematic diagram of an airborne system, in which (a) is a schematic diagram of the airborne system carried on a fixed-wing aircraft, (b) is a schematic diagram of the airborne system carried on a helicopter, and 1 represents a transmitting loop, 2 represents a sensor bird, 3 represents a sensor, 4 represents a bearing cable, and an arrow represents a flight direction of the system.

Referring to FIG. 1, shown is an observation device with the airborne method, characterized in that a transmitting system and a receiving system of the observation device are all carried on the flight platform. Due to the heavy weight of the system, a manned aircraft is often used as the flight platform. Also, due to the limitation of the power supply and carrying capacity of the flight platform, the size and weight of the transmitting system are relatively small, and the transmitting power is relatively low.

Figure 2:
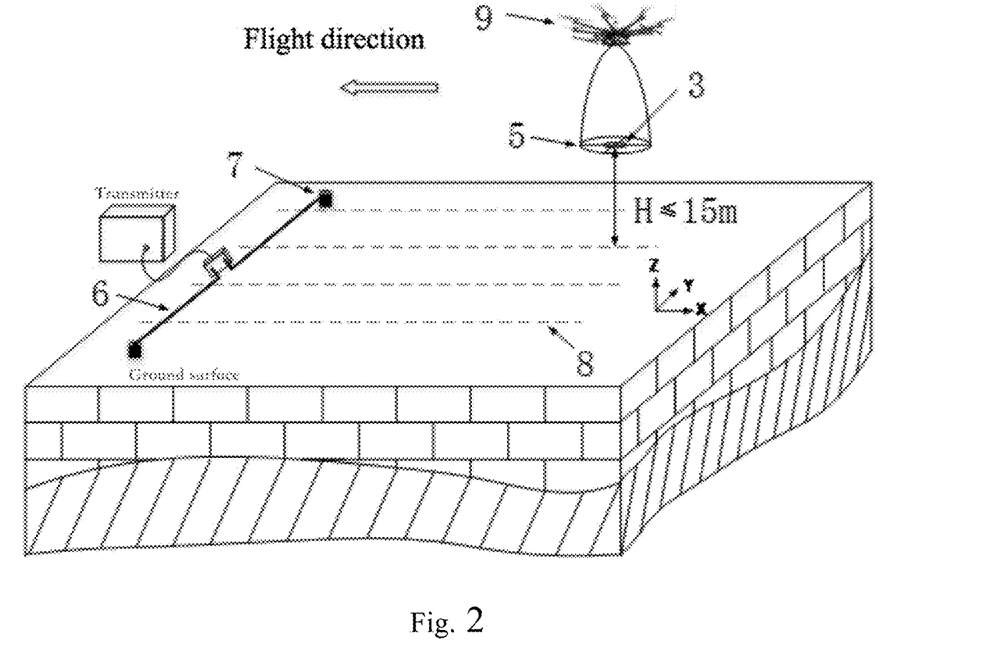
FIG. 2 is a schematic diagram of a semi-airborne system, in which 5 represents a carrying structure, 6 represents a transmitting wire, 7 represents a grounded electrode, 8 represents a survey line, 9 represents an unmanned aerial vehicle, and H represents a height of the sensor from the ground surface.

The semi-airborne method is characterized in that the transmitting system is arranged on the ground and the receiving system (including a sensor and a receiver) is carried on the flight platform. Referring to FIG. 2, shown is an observation device with the semi-airborne method. Different from the airborne method, the semi-airborne method is no longer limited by the power supply and carrying capacity of the flight platform, such that the transmitting power of a transmitting portion arranged on the ground can be larger, which is helpful to realize a greater survey depth than the airborne method. On the other hand, due to the light weight of a receiving portion itself, the low-cost unmanned airborne vehicles (UAV) can be used as the flight platform, thus greatly reducing the flight application cost compared with the airborne system which can only use the manned aircraft. Owing to these characteristics, the semi-airborne electromagnetic surveying method has the advantages of high efficiency, large depth, low cost and so on, so the semi-airborne electromagnetic surveying method attracts more and more attention from the market.

According to the nature of the response, the semi-airborne electromagnetic surveying method can be divided into a frequency domain method and a time domain method, wherein the method for studying the relationship between the earth's steady-state response and the frequency is called the frequency domain method, and the method for surveying the earth's transient response after excitation pulse is turned off is called the time domain method or a transient electromagnetic method. Although the two methods differ in the specific implementation of extracting the underground electrical structure distribution information, the surveying processes of the two methods are basically the same, as shown in FIG. 2, a transmitting device is arranged on the ground surface, which is commonly a long grounding conductor (that is, the transmitting device in FIG. 2 consists of transmitting cables and grounding electrodes) and a closed loop. A transmitter generates an excitation electromagnetic field to the earth through the transmitting device according to a preset waveform, and one UAV (such as a drone and an unmanned airship) carries sensors to observe the response of the earth along a preset survey line. The survey line is generally designed along the perpendicular orientation of the transmitting cable, and can be symmetrically designed with respect to the transmitting cable, or can be designed only on one side of the transmitting cable. At present, the most common sensor in semi-airborne electromagnetic surveying is the inductive magnetometer, which is mainly used for observing a response of the earth to a Z-axis alternating magnetic field. In the specific flight observation process, a terrain tracking flight is generally adopted, that is, the height of the sensor above the ground is always kept at a certain set value.

Compared with the traditional ground method, the semi-airborne electromagnetic surveying method has higher working efficiency, but also the following problems:

(1) Failure in Increase of the Signal-to-Noise Ratio Through Stacking of a Large Amount of Periods during the ground observation, the signal-to-noise ratio of observation data can usually be increased through stacking of data for a large amount of periods (or a long time). But for the flight observation, the observation position changes continuously with the flight, and the amount of data that can be used for stacking for a single observation point may be very limited; taking the time domain method as an example, during the ground observation, the number of periods for stacking often reaches several hundred, but in the semi-airborne observation, the number of periods for stacking is generally less than 10; and as a result, the signal-to-noise ratio of the data often fails to meet the requirements, and thus the system cannot reach the expected maximum surveying depth;

(2) Failure in Multi-Direction Gradient Surveying multi-direction gradient surveying is of great significance to improve the resolution of underground electrical anomalies by the system; while referring to the definition of the coordinate direction shown in FIG. 2, the existing semi-airborne electromagnetic surveying method can only obtain the gradient of the horizontal X direction (the direction of the survey line) by data backtracking, neither the gradient of the vertical direction (Z direction) nor the gradient of the horizontal Y direction can be obtained, and the gradient observation result obtained by the existing semi-airborne electromagnetic surveying method is not a synchronous observation result;

(3) Single Field of Observation through multi-field and multi-component observations, more observation "angles" can be obtained, and the accuracy of the inversion interpretation can be significantly improved by mutual constraint; and the existing semi-airborne electromagnetic surveying method can only observe the Z-axis magnetic field response of the earth, and neither other magnetic field response components (X-axis and Y-axis) nor the electric field responses ($E_X$, $E_Y$, $E_Z$) of the earth can be observed.

In fact, part of the common reasons for the above-mentioned problems (2) and (3) lie in the fact that the carrying capacity of low-cost UAVs often cannot support carrying multiple sensors (mainly referring to inductive magnetometers used in the existing system). If a heavy-duty drone or even a manned aircraft is adopted, on the one hand, the flight cost may be greatly increased, making the method lose the economic advantage; on the other hand, even if the heavy-duty drone or the manned aircraft can be used, the above problems cannot be completely solved.

SUMMARY OF THE INVENTION

The present invention provides a multi-mode data observation method based on unmanned aerial vehicle (UAV) formation for semi-airborne electromagnetic surveying, in order to solve the problems that the existing semi-airborne electromagnetic surveying method can neither increase a signal-to-noise ratio through stacking of a large amount of periods nor carry out three-direction gradient observation and is single in observation field quantity.

The multi-mode data observation method based on UAV formation for the semi-airborne electromagnetic surveying is provided in the present invention. In case where a long grounded wire is used as a transmitting antenna, the center point of the transmitting wire is taken as the origin, the survey line direction is taken as the X direction, a direction on a ground plane perpendicular to the survey line direction is taken as the Y direction, and the vertical direction perpendicular to the ground plane is taken as the Z direction; and in case where a closed loop is used as the transmitting antenna, the center point of the closed loop is taken as the origin, the survey line direction is taken as the X direction, the direction on the ground plane perpendicular to the survey line direction is taken as the Y direction, and the vertical direction perpendicular to the ground plane is taken as the Z direction.

The method includes four basic formation modes: a ZX formation mode, a ZZ formation mode, an XX formation mode, and an XZ formation mode, wherein each basic formation mode includes at least two UAVs and each UAV carries a sensor; during the data observation of the semi-airborne electromagnetic survey, one or more of the four basic formation modes are combined as the practically adopted UAV formation mode;

the ZX formation mode is configured to obtain the Z component of the response field with a high signal-to-noise ratio and the X direction gradient data of the Z component of the response field in different scales;

the ZZ formation mode is configured to obtain the Z direction gradient data of the Z component of the response field in different scales;

the XX formation mode is configured to obtain the X component of the response field with a high signal-to-noise ratio and the X direction gradient data of the X component of the response field in different scales;

and the XZ formation mode is configured to obtain the Z direction gradient data of the X component of the response field in different scales.

Further, the ZX formation mode is that each UAV carries a Z-axis sensor for surveying the Z component of a response electric field or a response magnetic field generated by the earth under excitation of the transmitting source disposed on the ground, and during the formation flight of the UAVs, all UAVs are deployed at specified intervals along the survey line in the X direction with the same Y coordinates and Z coordinates;

further, the ZZ formation mode is that each UAV carries a Z-axis sensor, and during the formation flight of the UAVs, all UAVs are deployed at specified intervals along the survey line in the Z direction with the same X coordinates and Y coordinates;

further, the XX formation mode is that each UAV carries an X-axis sensor for observing the X component of the response electric field or the response magnetic field generated by the earth under the excitation of the transmitting source disposed on the ground, and during the formation flight of the UAVs, all UAVs are deployed at specified intervals along the survey line in the X direction with the same Y coordinates and Z coordinates;

and further, the XZ formation mode is that each UAV carries an X-axis sensor, and during the formation flight of the UAVs, all UAVs are deployed at specified intervals along the survey line in the Z direction with the same X coordinates and Y coordinates.

Further, the sensor can adopt one or more of the following sensors: a single-component inductive magnetometer, a multi-component inductive magnetometer, a single-component fluxgate magnetometer, a multi-component fluxgate magnetometer, an optical pump magnetometer, a superconducting quantum interference device, a single-component capacitive electric field sensor, and a multi-component capacitive electric field sensor.

Based on the formation observation method disclosed in the present invention, the observation data with the high signal-to-noise ratio can be obtained by the multiple coverage observation on an observation target; the multi-scale and multi-directional gradient data can be obtained by processing the observation data of the same type of sensors at different positions and at the same time; and the multi-field data can be obtained by carrying different types of sensors.

From the above, compared with the existing semi-airborne data observation method based on only a single aircraft, the method disclosed in the present invention can obtain multi-field and multi-component observation data of the response field with higher signal-to-noise ratio, and multi-scale and multi-directional gradient data of the response field, which can help to achieve more precise and reliable survey of underground electrical anomalies, thereby providing more powerful technical services for high-resolution, economical and rapid survey of deep large deposits.

BRIEF DESCRIPTION OF THE DRAWINGS

The drawings are used to provide a further understanding of the technical solution of the present invention and constitute a part of the specification. Also, the drawings serve to explain the technical solution of the present invention together with the embodiments of the present invention, and do not constitute a limitation to the technical solution of the present invention.

DETAILED DESCRIPTION OF THE INVENTION

In order to make the object, technical solution and advantages of the invention clearer, the embodiments of the invention are described in detail in combination with the drawings below. It should be noted that the embodiments of the present invention and the features in the embodiments can be in any combination with each other in case of no conflict.

The technical solutions of the present invention will be described in detail below with particular embodiments.

In a traditional semi-airborne electromagnetic surveying method, usually a flight platform carrying an observation system (including a sensor and a receiver) is used for operation. Due to the motion observation property of the flight platform, it's difficult to increase the signal-to-noise ratio through stacking of a large amount of periods during the processing of data. This is because the stacking of a large amount of periods means an increase in observation time "in the same position", but the motion property of the flight platform cannot guarantee that the observation is always "in the same position". Therefore, for the traditional semi-airborne surveying method, only limited periods can be used for stacking, which has limited contribution to the increase of the signal-to-noise ratio of data. On the other hand, multi-field, multi-component and multi-directional gradient observation is of great significance to improve the performance of the surveying system. However, if low-cost UAVs are selected under the consideration of the economics of the surveying, it is difficult to realize multi-field and multi-component and multi-directional gradient observation since multiple sensors and corresponding structural components cannot be carried at the same time.

In the embodiment, the UAV formation technology is combined with the requirements for multi-component and multi-field quantity and gradient observation in geophysics, and multiple UAVs respectively carry specified types of sensors for formation flight, thereby realizing more precise and reliable extraction of underground structure information.

The multi-mode data observation method based on UAV formation for the semi-airborne electromagnetic surveying described in this embodiment mainly comprises four basic formation modes: 1) the ZX formation mode; 2) the ZZ formation mode; 3) the XX formation mode; and 4) the XZ formation mode, wherein UAV formation required for each basic formation mode includes at least two UAVs.

Figure 3:
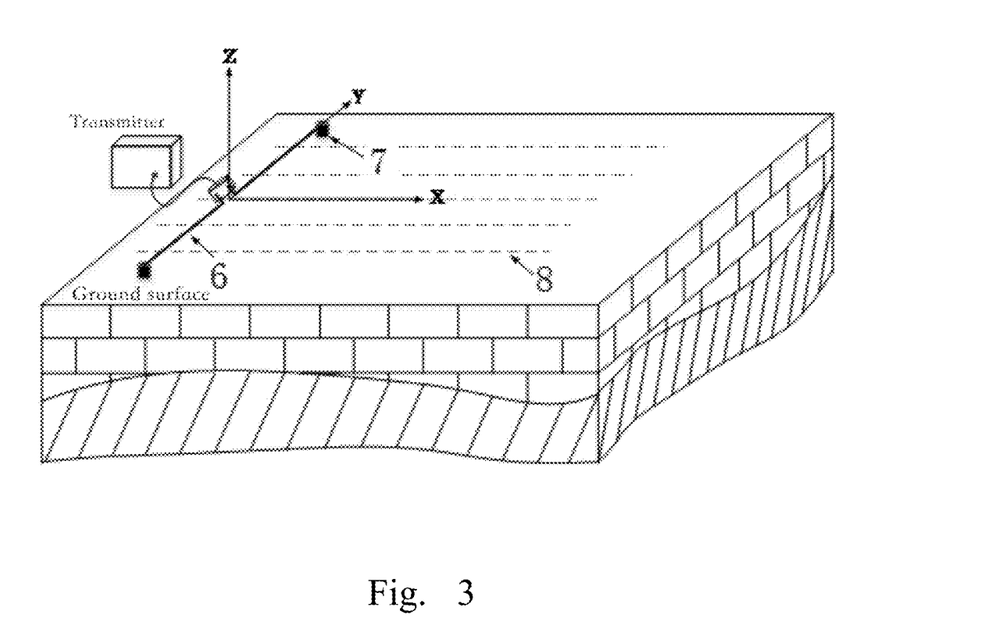
FIG. 3 is a schematic diagram of coordinate system settings for a survey area.

The rectangular coordinate system setting adopted by the above method is as shown in FIG. 3. The center point of the transmitting wire is taken as the origin, the survey line direction is taken as the X direction, the direction on the ground plane perpendicular to the survey line direction is taken as the Y direction, and the vertical direction perpendicular to the ground plane is taken as the Z direction.

Figure 4:
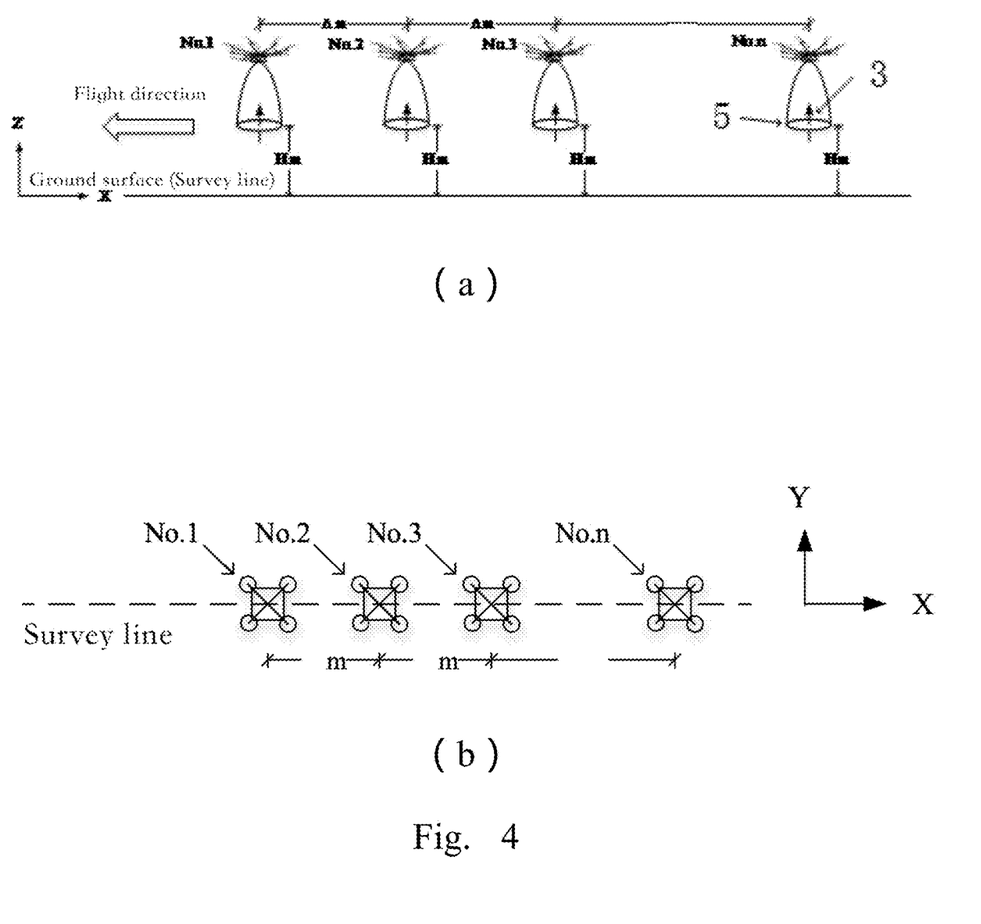
FIG. 4 is a schematic diagram of a ZX formation mode, in which (a) is a main view and (b) is a top view.

The ZX formation means that each UAV carries a Z-axis sensor (for observing the Z component of a response electric field or a response magnetic field generated by the earth under the excitation of the transmitting source disposed on a ground), and the formation is deployed along the survey line in the X direction. As shown is FIG. 4, after lifted off, the UAVs can fly in sequence along the survey line, with the distance between the two adjacent vehicles being $\Delta$ meters, and the distance between each vehicle and the ground being H meters. Observing in this formation mode, multiple coverage of the same observation point is realized to obtain the data with higher signal-to-noise ratio of the Z component of the response field, which is helpful to increase the surveying depth of the system. In addition, X-direction gradient data of different scales of the Z component of the response field can be obtained by processing the observation data of different UAVs at the same time.

Figure 5:
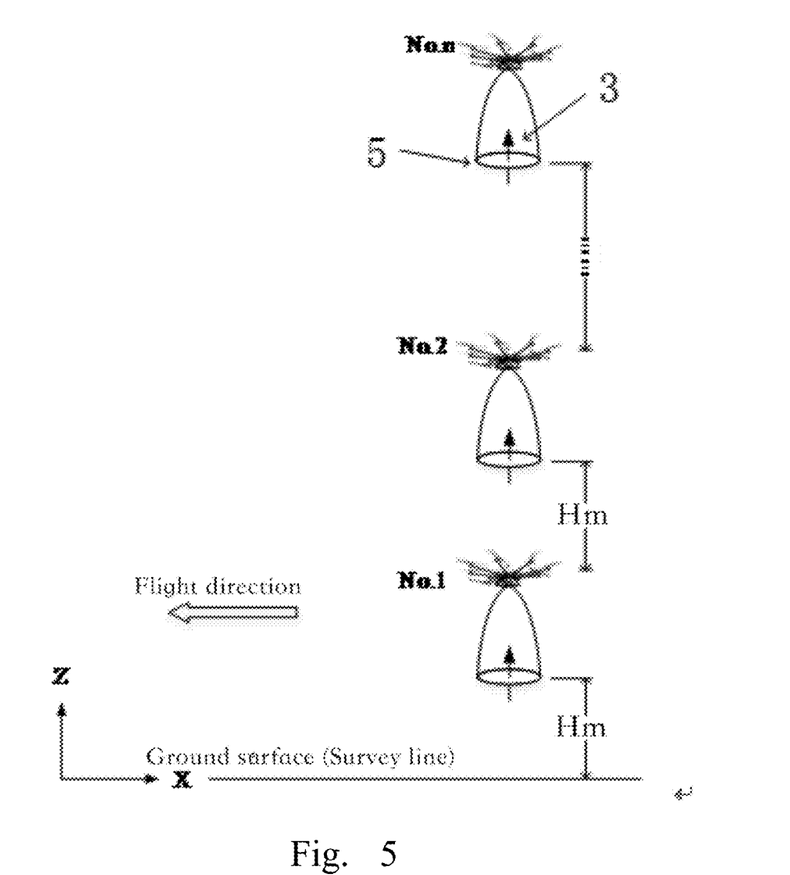
FIG. 5 is a schematic diagram of a ZZ formation mode.

The ZZ formation means that each UAV carries the Z-axis sensor, and the formation is deployed along the survey line in the Z direction. As shown in FIG. 5, the UAVs are numbered No. 1 to No. n, the sensor of the No. 1 UAV is H meters from the ground, the No. 2 UAV is located directly above the No. 1 UAV and the sensor carried on the No. 2 UAV is h meters from the top of the No. 1 UAV, and so on until the No. n UAV. After forming the above vertical formation, each UAV advances at a constant speed along the survey line, in order to keep the relative positional relationship among the UAVs unchanged. The Z-direction gradient data of different scales of the Z component of the response field can be obtained by processing the observation data of different UAVs at the same time.

Figure 6:
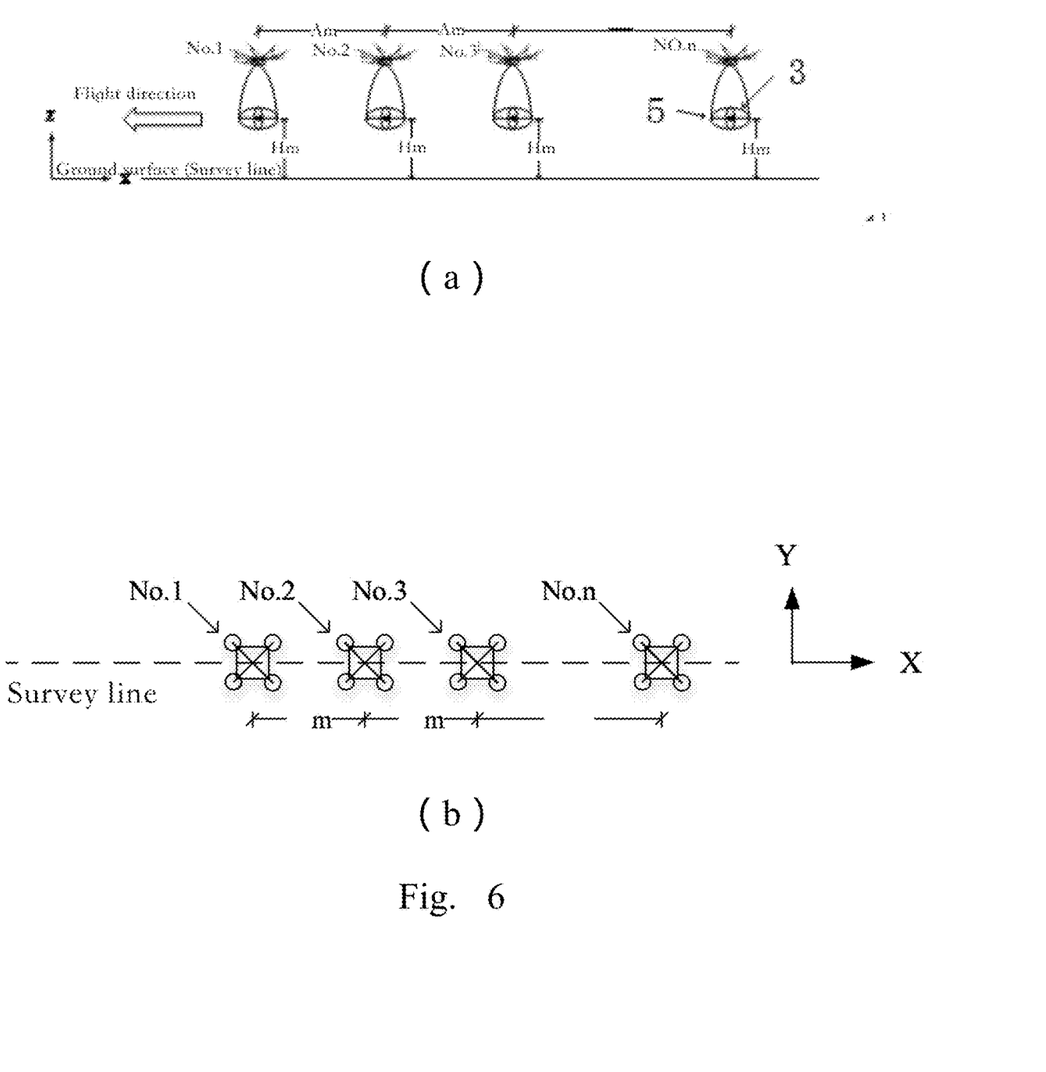
FIG. 6 is a schematic diagram of an XX formation mode, in which (a) is a main view and (b) is a top view.

The XX formation means that each UAV carries the X-axis sensor (for observing the X component of the response electric field or response magnetic field generated by the earth under the excitation of the transmitting source disposed on the ground), and the formation is deployed along the survey line in the X direction. As shown in FIG. 6, after lifted off, the UAVs can fly in sequence along the survey line, with the distance between the two adjacent vehicles being $\Delta$ meters, and the distance between each vehicle and the ground being H meters. Observing in this formation mode, multiple coverage of the same observation point is realized to obtain the data with higher signal-to-noise ratio of the X component of the response field, which helps to improve the resolution capability of the system to the transverse discontinuous resistivity structure of the earth. In addition, the X-direction gradient data of different scales of the X component of the response field can be obtained by processing the observation data of different UAVs at the same time.

Figure 7:
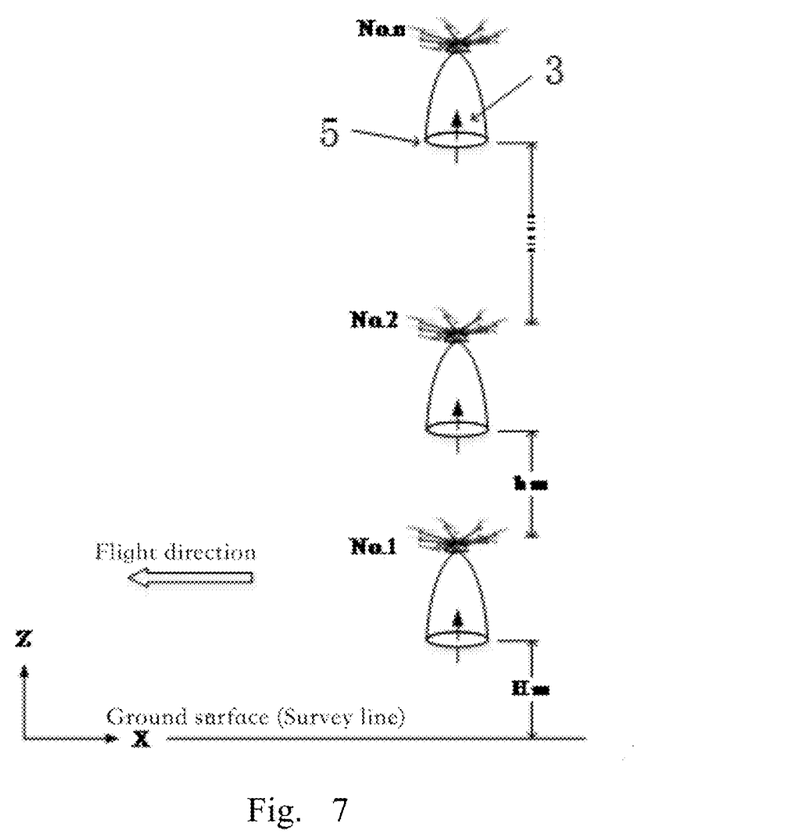
FIG. 7 is a schematic diagram of an XZ formation mode.

The XZ formation means that each UAV carries the X-axis sensor, and the formation is deployed along the survey line in the Z direction. As shown in FIG. 7, the UAVs are numbered No. 1 to No. n, the sensor of the No. 1 UAV is H meters from the ground, the No. 2 UAV is located directly above the No. 1 UAV and the sensor carried by the No. 2 UAV is h meters from the top of the No. 1 UAV, and so on until the No. n UAV. After forming the above vertical formation, each UAV advances at a constant speed along the survey line, in order to keep the relative positional relationship among the UAVs unchanged. The Z-direction gradient data of different scales of the X component of the response field can be obtained by processing the observation data of different UAVs at the same time.

In actual observation, the above four formation modes are combined to form the practically adopted UAV formation for semi-airborne electromagnetic surveying, which can realize multi-field, multi-component and multi-directional gradient observation.

According to the analysis on surveying requirements, the sensors that can be selectively carried mainly include: the single-component inductive magnetometer, the multi-component inductive magnetometer, the single-component fluxgate magnetometer, the multi-component fluxgate magnetometer, the optical pump magnetometer, the superconducting quantum interference device, the single-component capacitive electric field sensor, and the multi-component capacitive electric field sensor.

As an application example (to which the specific implementation is not limited), an ordinary agricultural plant protection UAV is selected as the carrying platform, and the maximum carrying capacity of a single vehicle is generally not more than 10 kg.

Figure 8:
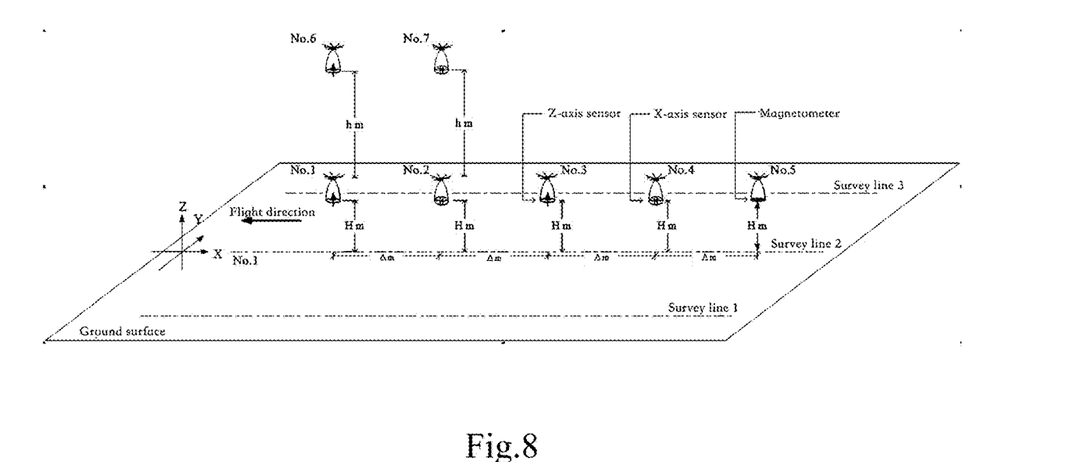
FIG. 8 is a schematic diagram of a formation mode of a formation system with seven unmanned aerial vehicles.

As shown in FIG. 8, seven UAVs are used to form a formation: based on the No. 1 UAV, the No. 2 to No. 5 UAVs are located behind the No. 1 UAV (in the X direction, the forward direction is the front), and the No. 6 and No. 7 UAVs are respectively located directly above the No. 1 and No. 2 UAVs (in the Z direction). Except for the No. 6 and the No. 7 UAVs, the height of other UAVs from the ground surface is h meters, i.e., 12 meters in this example. the No. 6 and No. 7 UAVs are located directly h meters above the No. 1 and No. 2 UAVs, i.e., 10 meters in this example. For the No. 1 to No. 5 UAVs, the distance between the two adjacent UAVs is A meters, i.e., 10 meters in this example. During the observation, the positional relationship between all UAVs remained fixed, and the No. 1 UAV is taken as a reference to fly along the survey line.

Among the above seven UAVs, the No. 1, No. 3 and No. 6 UAVs each carry one Z-axis inductive magnetic field sensor (with the resonant frequency of 30 kHz, and weighting less than 3 kg), a receiver (with battery, and weighting 1.6 kg), and lightweight material connecting rods, cables, etc. (for fixing the sensors, and weighting less than 0.5 kg); the No. 2, No. 4 and No. 7 UAVs each carry one X-axis capacitive electric field sensor (with an operating frequency range from 0.1 Hz to 15 kHz and weighting less than 2 kg), a receiver (including battery, and weighing 1.6 kg), and lightweight material connecting rods, cables, etc. (weighting less than 0.5 kg); and the No. 5 UAV carries a light pump magnetometer and a corresponding acquisition system, a fixture, etc. (totally weighting less than 5 kg). It can be seen that this formation mode is a combination of several basic modes mentioned in the invention.

The following observation results can be obtained with the above formation:

(1) when the No. 1 and No. 3 UAVs form the ZX basic formation, the multiple coverage of the same observing point is realized to obtain the Z component data with higher signal-to-noise ratio of the response alternating magnetic field, which is helpful to improve the surveying depth of the system; and also, the X-direction gradient data of the Z component of the response alternating magnetic field can be obtained by processing the observation data of the two at the same time;

(2) when the No. 1 and No. 6 UAVs form the ZZ basic formation, the Z-direction gradient data of the Z component of the response alternating magnetic field can be obtained by processing the observation data of the two at the same time;

(3) when the No. 2 and No. 4 UAVs form the XX basic formation, the multiple coverage of the same observing point is realized to obtain the X component data with higher signal-to-noise ratio of the response electric field, which is helpful to improve the resolution capability of the system to the transverse discontinuous resistivity structure of the earth; and also, the X-direction gradient data of different scales of the X component of the response electric field can be obtained by processing the observation data of different UAVs at the same time;

(4) when the No. 2 and No. 7 UAVs form the XZ basic formation, the Z-direction gradient data of the X component of the response electric field can be obtained by processing the observation data of the two at the same time;

and (5) magnetic surveying data can be obtained with the data obtained by the No. 6 UAV.

The invention claimed is:

1. A multi-mode data observation method based on unmanned aerial vehicle formation for semi-airborne electromagnetic surveying, characterized in that in case where a long grounded wire is used as an transmitting antenna, a center point of the transmitting wire is taken as the origin, the survey line direction is taken as the X direction, the direction on a ground plane perpendicular to the survey line direction is taken as the Y direction, and the vertical direction perpendicular to the ground plane is taken as the Z direction;

in case where a closed loop is used as the transmitting antenna, the center point of the closed loop is taken as the origin, the survey line direction is taken as the X direction, the direction on the ground plane perpendicular to the survey line direction is taken as the Y direction, and the vertical direction perpendicular to the ground plane is taken as the Z direction;

wherein the method comprises four basic formation modes: a ZX formation mode, a ZZ formation mode, an XX formation mode, and an XZ formation mode, wherein each basic formation mode comprises at least two unmanned aerial vehicles and each unmanned aerial vehicle carries a sensor;

during data observation of the semi-airborne electromagnetic survey, one or more of the four basic formation modes are combined as the practically adopted unmanned aerial vehicle formation mode;

the ZX formation mode is configured to obtain the Z component of the response field with a high signal-to-noise ratio and the X direction gradient data of the Z component of the response field in different scales;

the ZZ formation mode is configured to obtain the Z direction gradient data of the Z component of the response field in different scales;

the XX formation mode is configured to obtain the X component of the response field with a high signal-to-noise ratio and the X direction gradient data of the X component of the response field in different scales; and the XZ formation mode is configured to obtain the Z direction gradient data of the X component of the response field in different scales.

2. The method of claim 1, characterized in that, the ZX formation mode is that each unmanned aerial vehicle carries a Z-axis sensor for surveying the Z component of a response electric field or a response magnetic field generated by the earth under excitation of the transmitting source disposed on the ground, and during the formation flight of the unmanned aerial vehicles, all unmanned aerial vehicles are deployed at specified intervals along the survey line in the X direction with the same Y coordinates and Z coordinates.

3. The method of claim 1, characterized in that, the ZZ formation mode is that each unmanned aerial vehicle carries the Z-axis sensor, and during the formation flight of the unmanned aerial vehicles, all unmanned aerial vehicles are deployed at specified intervals along the survey line in the Z direction with the same X coordinates and Z coordinates.

4. The method of claim 1, characterized in that the XX formation mode is that each unmanned aerial vehicle carries an X-axis sensor for surveying the X component of the response electric field or the response magnetic field generated by the earth under the excitation of the transmitting source disposed on the ground, and during the formation flight of the unmanned aerial vehicles, all unmanned aerial vehicles are deployed at specified intervals along the survey line in the X direction with the same Y coordinates and Z coordinates.

5. The method of claim 1, characterized in that, the XZ formation mode is that each unmanned aerial vehicle carries the X-axis sensor, and during the formation flight of the unmanned aerial vehicles, all unmanned aerial vehicles are deployed at specified intervals along the survey line in the Z direction with the same X coordinates and Y coordinates.

6. The method of any one of claim 1, characterized in that the sensor is one or more of the following sensors: a single-component inductive magnetometer, a multi-component inductive magnetometer, a single-component fluxgate magnetometer, a multi-component fluxgate magnetometer, an optical pump magnetometer, a superconducting quantum interference device, a single-component capacitive electric field sensor, and a multi-component capacitive electric field sensor.

* * * * *